(12) United States Patent
Gandhi et al.

(10) Patent No.: US 11,593,622 B1
(45) Date of Patent: Feb. 28, 2023

(54) ARTIFICIAL INTELLIGENCE SYSTEM EMPLOYING GRAPH CONVOLUTIONAL NETWORKS FOR ANALYZING MULTI-ENTITY-TYPE MULTI-RELATIONAL DATA

(71) Applicant: Amazon Technologies, Inc., Seattle, WA (US)

(72) Inventors: Ankit Gandhi, Bangalore (IN); Arijit Biswas, Sunnyvale, CA (US); Anil Raghavendrachar Yelundur, Bangalore (IN); Vineet Shashikant Chaoji, Bangalore (IN)

(73) Assignee: Amazon Technologies, Inc., Seattle, WA (US)

( * ) Notice: Subject to any disclaimer, the term of this patent is extended or adjusted under 35 U.S.C. 154(b) by 428 days.

(21) Appl. No.: 16/791,831

(22) Filed: Feb. 14, 2020

(51) Int. Cl.
*G06N 3/08* (2006.01)
*G06N 3/04* (2023.01)
*G06F 16/901* (2019.01)
*G06Q 30/0202* (2023.01)
*G06Q 10/0837* (2023.01)
*G06Q 10/10* (2023.01)
*G06N 7/00* (2023.01)

(52) U.S. Cl.
CPC ....... *G06N 3/0472* (2013.01); *G06F 16/9024* (2019.01); *G06N 3/08* (2013.01); *G06N 7/005* (2013.01); *G06Q 10/0837* (2013.01); *G06Q 10/10* (2013.01); *G06Q 30/0202* (2013.01)

(58) Field of Classification Search
None
See application file for complete search history.

(56) References Cited

U.S. PATENT DOCUMENTS

| 2019/0109926 | A1* | 4/2019 | Hotchkies | H04L 67/63 |
|---|---|---|---|---|
| 2020/0358804 | A1* | 11/2020 | Crabtree | H04L 63/1416 |
| 2021/0149959 | A1* | 5/2021 | Wu | G06F 17/16 |
| 2021/0173011 | A1* | 6/2021 | Kajbaf | G06N 3/08 |
| 2021/0174217 | A1* | 6/2021 | Pai | G06N 3/08 |
| 2022/0129766 | A1* | 4/2022 | Potts | G06F 16/367 |

OTHER PUBLICATIONS

Alex Beutel, et al., "CopyCatch: Stopping Group Attacks by Spotting Lockstep Behavior in Social Networks", . In Proceedings of the 22nd International Conference on World Wide Web, 2013, pp. 119-130.

(Continued)

*Primary Examiner* — Anna C Deng
(74) *Attorney, Agent, or Firm* — Robert C. Kowert; Kowert, Hood, Munyon, Rankin & Goetzel, P.C.

(57) ABSTRACT

Respective initial feature sets are obtained for the nodes of a graph in which the nodes represent instances of entity types and edges represent relationships. Using the initial feature sets and the graph, a graph convolutional model is trained to generate one or more types of predictions. In the model, a representation of a particular node at a particular hidden layer is based on aggregated representations of neighbor nodes, and an embedding produced at a final hidden layer is used as input to a prediction layer. The trained model is stored.

20 Claims, 10 Drawing Sheets

(56) References Cited

OTHER PUBLICATIONS

Michael M. Bronstein, et al., "Geometric deep learning: going beyond Euclidean data", arXiv:1611.08097v2, May 3, 2017, pp. 1-22.
Mahsa Ghorbani, et al., "Multi-Layered Graph Embedding With Graph Convolutional Networks", arXiv:1811.08800v2, Nov. 22, 2018, pp. 1-5.
Aditya Grover, et al., "node2vec: Scalable Feature Learning for Networks", KDD, Aug. 2016, doi:10.1145/2939672.2939754, pp. 855-864.
William L. Hamilton, et al., "Representation Learning on Graphs: Methods and Applications", arXiv:1709.05584v3, Apr. 10, 2018, pp. 1-24.
Bryan Hooi, et al., "BIRDNEST: Bayesian Inference for Ratings-Fraud Detection", arXiv:1511.06030v2, Mar. 7, 2016, pp. 1-9.
Bryan Hooi, et al., "FRAUDAR: Bounding Graph Fraud in the Face of Camouflage", ACM, 2016, DOI: http://dx.doi.org/10.1145/2939672.2939747, pp. 1-10.
Meng Jiang, et al., "A General Suspiciousness Metric for Dense Blocks in Multimodal Data", . In IEEE International Conference on Data Mining(ICDM), 2015, pp. 781-786.
Meng Jiang, et al., "Inferring lockstep behavior from connectivity pattern in large graphs", CrossMark, Knowledge and Information System, Oct. 15, 2015, 48, pp. 399-428.
Nitin Jindal, et al., "Opinion Spam and Analysis", In Proceedings of the 2008 International Conference on Web Search and Data Mining, 2008, pp. 219-230.
Thomas N. Kipf, et al, "Semi-Supervised Classification with Graph Convolutional Networks", arXiv:1609.02907v4, Feb. 22, 2017, pp. 1-14.
Huayi Li, et al., "Analyzing and Detecting Opinion Spam on a Large-Scale Dataset via Temporal and Spatial Patterns, in Proceedings of the Ninth International AAAI Conference on Web and Social Media", Association for the Advancement of Artificial Intelligence, 2015, pp. 634-637.

Yixuan Li, et al, "In a World That Counts: Clustering and Detecting Fake Social Engagement at Scale", arXiv:1512.054572, Jan. 20, 2016, pp. 1-10.
Koji Maruhashi, et al., "MultiAspectForensics: Pattern Mining on Large-scale Heterogenous Networks with Tensor Analysis", IEEE, in 2011 International Conference on Advances in Social Networks Analysis and Mining, 2011, pp. 1-8.
Tomas Mikolov, et al., "Efficient Estimation of Word Representations in Vector Space", arXiv:1301.3781v3, Sep. 7, 2013, pp. 1-12.
Federico Monti, et al, "Geometric Matrix Completion with Recurrent Multi-Graph Neural Networks", arXiv:1704-06803v1, Apr. 22, 2017, pp. 1-9.
Bryan Perozzi, et al, "DeepWalk: Online Learning of Social Representations", arXiv:1403.6652v2, Jun. 27, 2014, pp. 1-10.
Kijung Shin, et al., "M-Zoom: Fast Dense-Block Detection in Tensors with Quality Guarantees", In Joint European Conference on Machine Learning and Knowledge Discovery in Databases (ECML/PKDD), 2016, pp. 264-280.
Junting Ye, et al., Discovering Opinion Spammer Groups by Network Footprints, . In JointEuropean Conference on Machine Learning and Knowledge Discovery in Databases, 2015, pp. 267-282.
Junting Ye, et al., "Temporal Opinion Spam Detection by Multivariate Indicative Signals", in Proceedings of the Tenth International AAAI Conference on Web and Social Media (ICWSM 2016), 2016, pp. 743-746.
Rex Ying, et al., "Graph Convolutional Neural Networks for Web-Scale Recommender Systems", arXiv:1806.01973v1, Jun. 6, 2018, pp. 1-10.
Jiaxuan You, et al., "GraphRNN: Generating Realistic Graphs with Deep Auto-regressive Models", in Proceedings of the 35th International Conference on Machine Learning, PMLR 80, 2018, pp. 1-10.
Marinka Zitnik, et al, "Modeling polypharmacy side effects with graph convolutional networks", Bioinformatics, 34, 2018, Downloaded from https://academic.oup.com/bioinformatics/article/34/13/i457/5045770 on Apr. 20, 2021, pp. i457-i466.
William L. Hamilton, "Inductive Representation Learning on Large Graphs", in 31st Conference on Neural Information Processing Systems (NIPS 2017), arXiv:1706.02216v4, Sep. 10, 2018, pp. 1-19.

\* cited by examiner

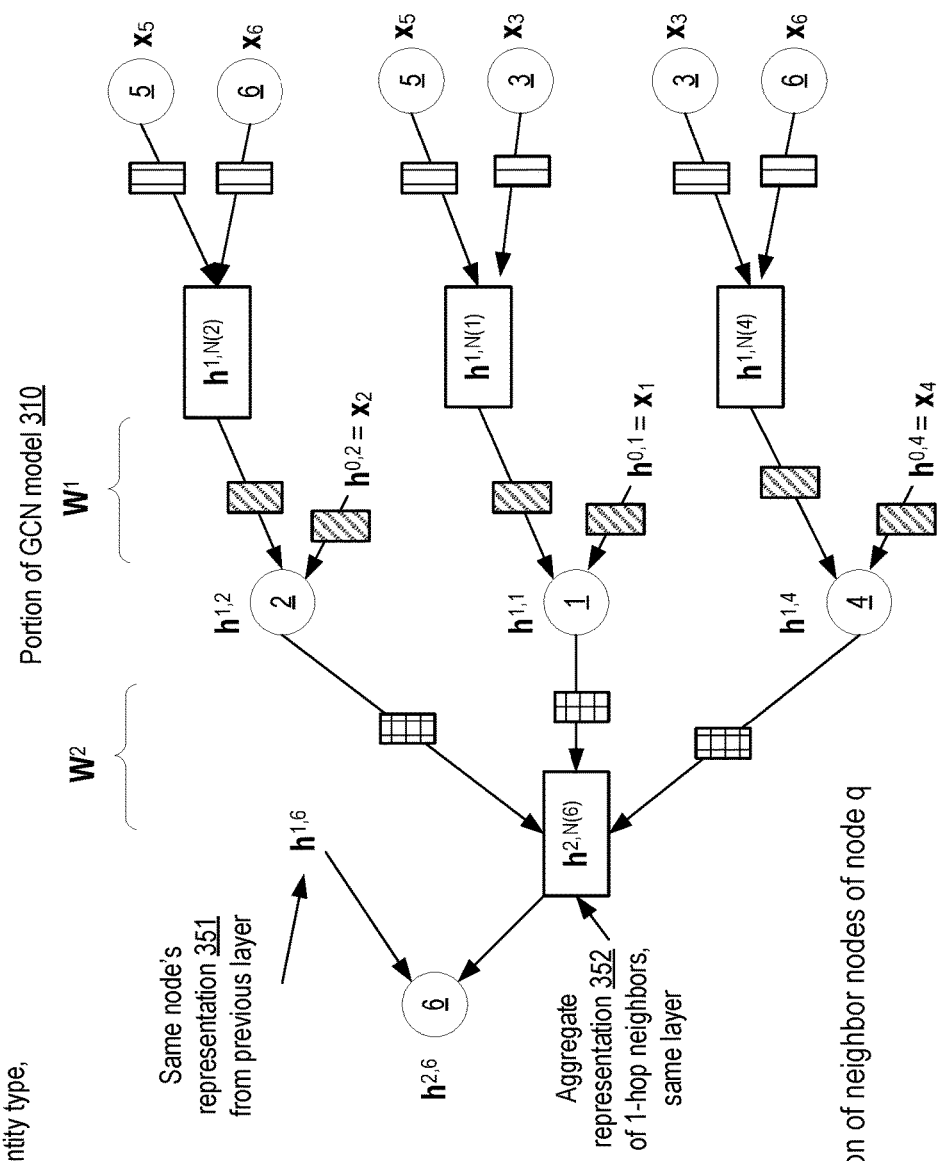
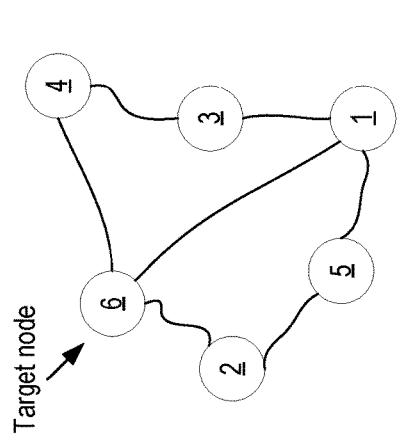
FIG. 3

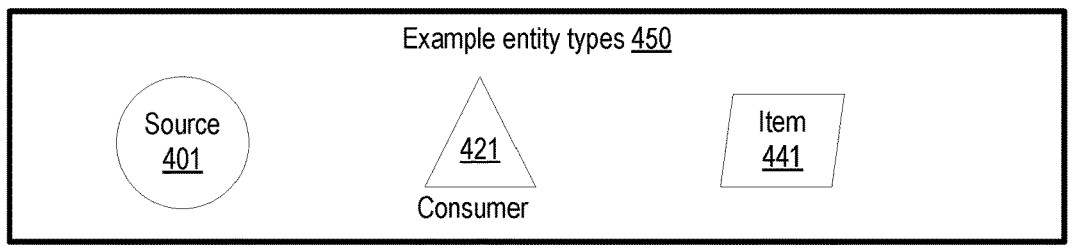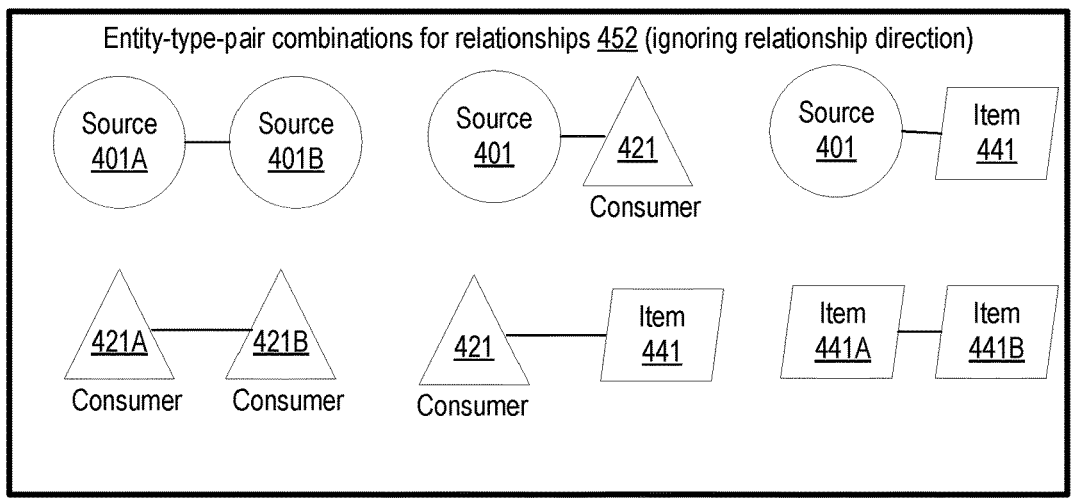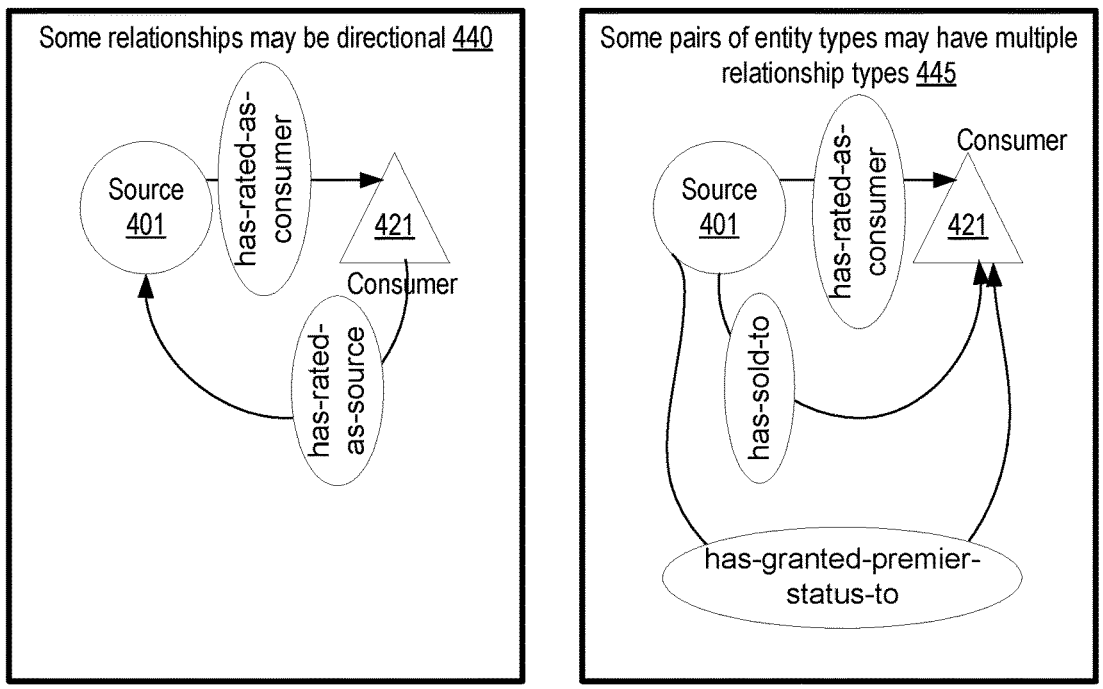
FIG. 4

Abusive item source/reviewer detection 601

Entity types 605A: item sources, item reviewers, items

Relationship types 611A: (# rating levels X rating times)

Prediction required 612A: identify abusive sources and abusive reviewers

---

Electronic payment prediction 621

Entity types 605B: item sources, item purchasers, items

Relationship type 611B: purchase

Prediction required 612B: predict probability of electronic payment for purchase w.r.t. (source, purchaser, item) combinaton

---

Item return probability prediction 641

Entity types 605C: item sources, items

Relationship types 611C: offers-item

Prediction required 612D: predict probability of return of an item

*FIG. 6*

ARTIFICIAL INTELLIGENCE SYSTEM EMPLOYING GRAPH CONVOLUTIONAL NETWORKS FOR ANALYZING MULTI-ENTITY-TYPE MULTI-RELATIONAL DATA

BACKGROUND

Machine learning combines techniques from statistics and artificial intelligence to create algorithms that can learn from empirical data and generalize to solve problems in various domains such as natural language processing, financial fraud detection, terrorism threat level detection, human health diagnosis and the like. In recent years, more and more raw data that can potentially be utilized for machine learning models is being collected from a large variety of sources, such as sensors of various kinds including medical equipment, web server logs, social media services, financial transaction records, security cameras, and the like.

The amount of collected data can sometimes become so large that organizing and utilizing the data can itself become a challenging problem, particularly when examples of the problem to be solved are present in only a very small subset of the available data. For example, in the problem of detecting financial fraud, the number of examples of actual fraudulent behavior may be only a tiny fraction of the collected set of transaction records, so coming up with a large enough number of realistic examples from which to train a machine learning model to quickly detect attempted fraudulent transactions may not be easy.

For many large web-based enterprises, rapid responses to misuse or abuse of the services being provided is of high importance. For example, for e-retail enterprises, discovering cases of fraudulent reviews, which can tend to skew sales for various items strongly either positively or negatively, and responding quickly to such occurrences (e.g., by removing the fraudulent reviews, preventing further reviews from the users responsible for fraudulent reviews, etc.) is desirable. Predicting various types of transactions, including whether a given item of an e-retail inventory is likely to be returned, or whether a particular type of payment mechanism will be used, are also important problems for which solutions may be needed. Constructing machine learning models which can help with such types of problems remains a non-trivial technical challenge.

BRIEF DESCRIPTION OF DRAWINGS

FIG. 3 illustrates basic graph convolutional network (GCN) concepts using a simple single-entity-type, single-relationship-type graph, according to at least some embodiments.

FIG. 4 illustrates examples relationship types which may be modeled for a collection of three entity types, according to at least some embodiments.

FIG. 6 illustrates three example types of prediction problems which may be addressed using GCNs, according to at least some embodiments.

Figure 1:
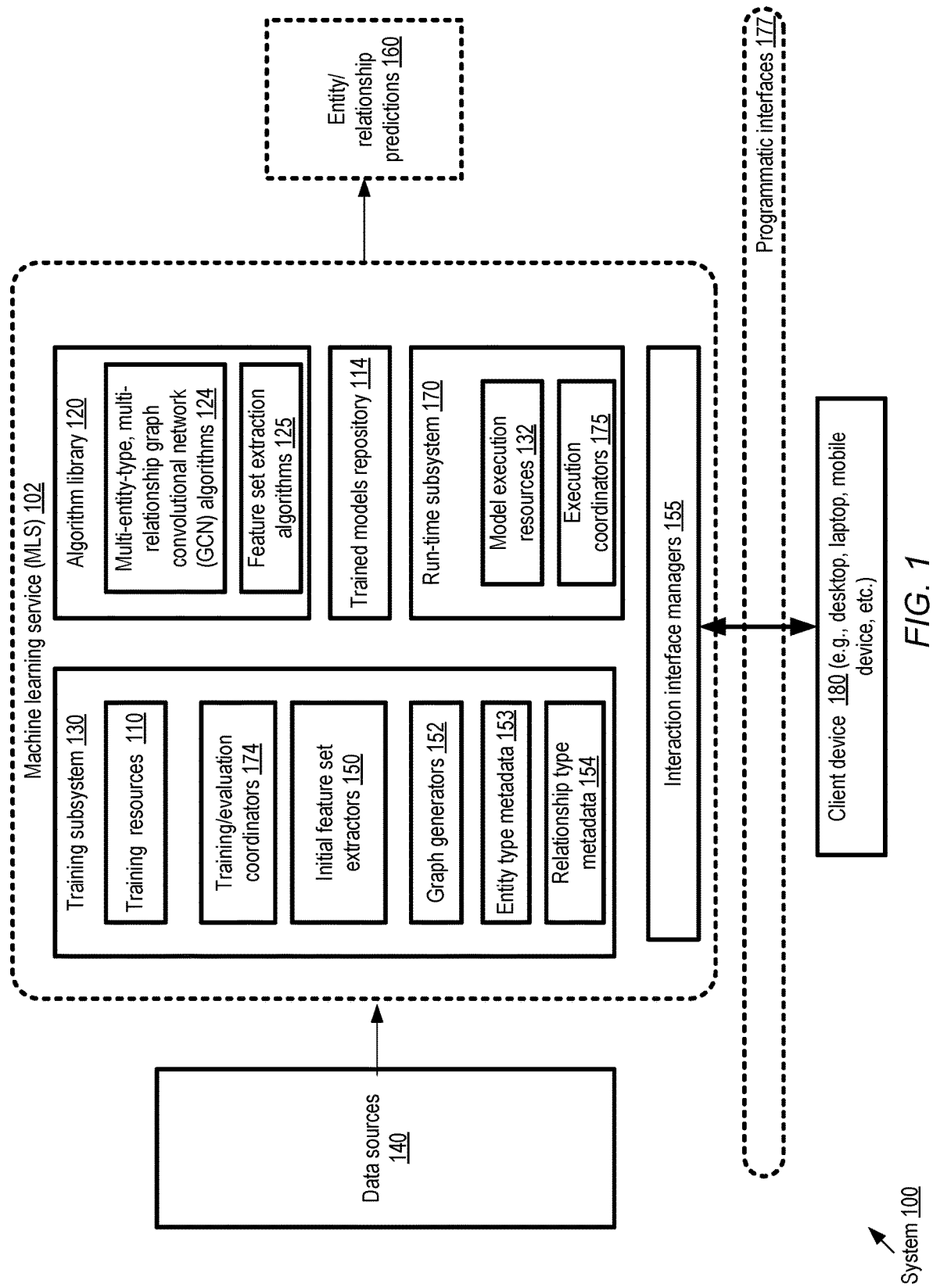
FIG. 1 illustrates an example system environment in which graph convolution network algorithms may be used to analyze data representing multiple types of relationships between instances of multiple entity types, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and apparatus for training and using graph convolutional network (GCN) models to generate predictions with respect to data sets representing instances of multiple entity types, with multiple types of relationships among the instances of the entity types. The raw data sets used to train such GCN models may be converted (e.g., in a pre-processing phase) into graphs with a plurality of nodes and a plurality of edges, with respective nodes representing instances of an entity type, and respective edges representing logical relationships between the instances. A number of different types of predictions may be made using the types of GCN models described herein in different embodiments: for example, the existence of edges between nodes (i.e., relationships between entities) may be predicted, nodes or entities may be classified, edges or relationships may be classified, subgraphs may be classified, quantities associated with edges or nodes may be predicted, and so on. In the context of an e-retail web site, for example, the prediction types may include identifying likely cases of abusive or fraudulent reviews, predicting a type of payment mechanism likely to be used for an anticipated purchase transaction, predicting whether an item is likely to be returned after purchase, predicting whether a delivery of an item is likely to be delayed, predicting future demands for items, and so on. An initial set of problem-domain-specific features may be obtained for the nodes of the graph in various embodiments, e.g., either from a client or user, or using automated techniques (including for example other types of machine learning models). The initial feature sets and the graphs may be used to train a GCN model to generate predictions of the desired type, which may then be used to trigger various types of automated actions such as modifying the content displayed on various web pages, modifying fulfilment or delivery plans for items of an e-retail inventory, and so on. It is noted that although the examples used most frequently in this document relate to the e-commerce domain, the techniques described herein may be used with equal success in other domains, including for example health care, security, banking, and so on.

As one skilled in the art will appreciate in light of this disclosure, certain embodiments may be capable of achieving various advantages, including some or all of the following: (a) reducing the overall amount of CPU, memory, networking and storage resources that have to be utilized for generating predictions of a desired quality level with respect to a data set representing multiple entity types and multiple relationship types, even in scenarios in which the fraction of available labeled data records is low and at least some of the relationships are non-linear, (b) enhancing the user experience of users interacting with e-retail and other web sites, e.g., by preventing the propagation of fraudulent or abusive information via such web sites, and/or (c) enhancing the security of various web-based applications by quickly detecting attempted misuses of the applications.

According to at least some embodiments, a system may comprise one or more computing devices, e.g., at a network-accessible machine learning service implemented as part of a provider network or cloud computing environment. The computing devices may include instructions that when executed on or across one or more processors cause the devices to obtain an indication of (a) a plurality of entity types associated with a problem domain and (b) a plurality of relationship types among the plurality of entity types. In one example scenario associated with an e-retail web site, the plurality of entity types may include an item type and an item consumer type, and the plurality of relationship types may include an acquisition relationship indicating that an item was acquired or purchased by an item consumer.

A source data set comprising records pertaining to the entity and relationship types may also be obtained in at least some embodiments. From the source data set, a graph representation comprising a plurality of nodes and a plurality of edges may be generated. The nodes may represent respective instance of an entity type, and an edge between a pair of nodes may indicate a relationship of a particular relationship type between the respective instances represented by the pair of nodes. In various embodiments, at least one node of the graph may be linked to a plurality of other nodes via a respective edge, indicating a plurality of relationships of the node. In various embodiments, the source data set may comprise labels for a subset of the nodes and/or edges, with the specific labels being dependent on the kind of problem which is to be solved. For example, in a scenario in which abusive reviews are to be detected, some of the edges representing reviews may be labeled as abusive reviews.

An initial feature set for at least some of the nodes of the graph may be obtained at the computing devices in various embodiments. The features may be provided via programmatic interfaces by a client in some embodiments; in other embodiments, at least some of the features may be generated using automated techniques, e.g., using other machine learning models and/or data sources indicated by clients. Using the graph representation and the respective initial feature sets, a graph convolutional network (GCN) model may be trained to generate one or more types of predictions of interest in various embodiments. The types of predictions may also be specified by clients programmatically in some embodiments. Within the GCN model, a representation of a particular node at a particular hidden layer of the model may be based at least in part on aggregated representations of neighbor nodes of the particular node in various embodiments. The representations of the neighbor nodes may be aggregated at least across (a) a set of one-hop neighbors of the particular node with respect to a first relationship type and (b) a set of one-hop neighbors of the particular node with respect to a second relationship type in some embodiments. A learned embedding corresponding to the particular node, obtained from a final hidden layer of the GCN model may be provided as input to a prediction layer of the GCN model and used to obtain the desired types of predictions with respect to the particular node. Training may be conducted using mini-batches of the input data in some embodiments, with the size of the mini-batches and the specific loss function (e.g., cross-entropy loss) comprising hyper-parameters of the training procedure. A trained version of the GCN model may be stored, and used to generate a prediction with respect to one or more instances of the entity types represented in the graph. For example, continuing with the e-retail web site scenario introduced above, one of the predictions made may include a predicted probability that a particular item (an instance of the item entity type) will be returned after acquisition or purchase by a consumer (an instance of the item consumer entity type).

After the GCN model has been trained with a particular training graph G1, a new graph G2 (which may comprise G1 combined with some new edges and/or some new nodes) may be provided as input for a prediction request in at least some embodiments, and the output generated by the trained model may include labels for the newly-added components of G2. In some cases, the labels for some of the original nodes/edges (of G1) may also be changed, e.g., due to processing of the new relationship information represented in G2. In one embodiment, the training graph may be based on a set of transactions or events which occurred with respect to a set of entities E during a time period T1, and the predictions requested using the trained version of the model may comprise labels for nodes/edges of the graph for a subsequent time period T2.

Within the GCN model, convolution operations transform and combine information from a given node's neighborhood, e.g., using information from one-hop neighbors at a time, to generate high-quality embeddings or representations of nodes for various types of problems. When multiple such convolutions are in effect stacked on top of each other, using respective layers of the model, information can be captured from relatively distant parts of the graph. In at least some embodiments, each node's convolutional module may have a different neural network architecture depending on the details of the neighborhood of the node; however, the modules may share the same set of parameters across all their nodes, thus making the parameter complexity of the GCN independent of graph size. Unlike content based deep and shallow models, including recurrent neural networks, traditional convolutional neural networks, etc., GCNs leverage both graph structure as well as content (e.g., as represented by the initial feature sets) for improved representation and modeling. Using GCNs as described, substantial improvements in prediction quality may be obtained for problems such as predicting probabilities of returns of inventory items, predicting the kinds of payment mechanisms that a customer of an e-retail site is likely to use, identifying misuse of reviewing features of websites (e.g., by a product's seller or source soliciting fake good reviews) and so on.

According to at least some embodiments, the representation of a particular node at a particular hidden layer of the model may be based at least in part on aggregated representations of neighbor nodes of the particular node, as well as on the representation of the particular node at the previous layer of the model. Thus, information pertaining to neighbor nodes of a given node may be combined with learned information about the given node itself (accumulated from other model layers) to help generate the embedding for the given node.

Obtaining appropriate problem-domain-specific initial feature sets may be important for the success of the GCN models in various embodiments. In some embodiments, an indication of a workflow to be used to generate at least a portion of the initial feature sets may be obtained via programmatic interfaces of a machine learning service, e.g., from a client on whose behalf the GCNs are to be employed. Such workflows may, for example, indicate one or more additional data sources from which the initial feature sets are to be obtained, transformation operations to be applied to records from such data sources to obtain the initial features, entity disambiguation techniques or models to be used, and so on. The specified workflows may be implemented or executed at a machine learning service in some embodiments as part of a preparatory step of the GCN model training technique. In at least one embodiment, the workflow may include utilizing one or more other types of machine learning models to analyze raw data to help generate the feature sets.

In some embodiments, the clients on whose behalf the GCN models are developed and used may provide guidance regarding various aspects of the training and deployment of the models. For example, a client may provide values of one or more model hyper-parameters, such as the dimensionality of initial feature set representations, the dimensionality of weight matrices used within the GCN models, the "depth" of node neighborhoods to be considered (e.g., the number of edges or hops in the graph) when aggregating information, the loss function to be used (e.g., cross-entropy loss), and so on.

As suggested above, predictions pertaining to a wide variety of problems may be generated using GCNs in different embodiments. Such predictions may, for example, include one or more of: (a) a predicted probability of an occurrence of an item acquisition transaction of a particular type, (b) a predicted probability that a review of an item does not satisfy an acceptability standard, (c) a predicted probability that an item of an inventory will be returned after the item has been purchased, (d) a predicted probability that a content item will reach a popularity threshold, or (e) a predicted demand for an item. The code for the GCN model may be written using any of a variety of programming languages and libraries in different embodiments, including languages such as Python, R, and then like.

A large number of logical relationship types may be modeled using the described technique in different embodiments. In the context of an e-retail web site for example, such relationships may include (a) a has-purchased-from relationship between an item consumer and an item source, (b) a has-in-stock relationship between an item and an item source, (c) a has-rated-source relationship between an item consumer and an item source, (d) a has-reviewed-item relationship between an item consumer and an item, (d) a sells relationship between an item source and an item, (e) a has-purchased relationship between an item consumer and an item, (f) a has-clicked-on-link relationship between an item consumer and an item, (g) a same-item-category relationship between one item and another item, or (h) a similarity-score relationship between one item and another item.

Based on the predictions generated using the GCN models, a number of different types of actions may be triggered automatically in different embodiments. Continuing with the example of an e-retail web site, such actions may include: (a) displayed content of the web site to be modified, (b) one or more promotional offers to be presented, or (c) a change to a fulfillment or delivery plan for one or more items or (d) a transfer of one or more items to meet an anticipated demand.

Example System Environment

FIG. 1 illustrates an example system environment in which graph convolution network algorithms may be used to analyze data representing multiple types of relationships between instances of multiple entity types, according to at least some embodiments. As shown, system 100 comprises resources and artifacts of a machine learning service (MLS) 102, as well as one or more data sources 140 from which records that are to be analyzed at the MLS 102 may be obtained. Such systems, at which predictions using machine learning techniques are generated, may be termed artificial intelligence systems in some embodiments. The machine learning service 102 may implement a set of programmatic interfaces 177, such as one or more web-based consoles, graphical user interfaces, command-line tools, application programming interfaces (APIs), and the like, which may be used by users or clients of the service 102 to interact with the service. Such users may submit programmatic requests via interfaces 177 from client devices 180 (e.g., laptops, desktops, mobile computing devices and the like), e.g., to specify aspects of machine learning tasks to be initiated, and receive corresponding responses from the service. Interaction interface managers 155 of the machine learning service 102 may receive the requests and send internal messages to other components of the service to perform operations to fulfill the requests. The other components of the MLS 102 may include a training subsystem 130, a run-time subsystem 170, an algorithm library 120 and a trained models repository 114 in the depicted embodiment.

In some embodiments, a client of the MLS 102 may use the programmatic interfaces 177 to submit at least the following types of information about a particular machine learning problem to be solved: the kinds of predictions to be generated (e.g., "predict whether a particular sales transaction is likely to be completed using a credit card", the types of entities involved (e.g., items, item consumers/purchasers, and item sources/suppliers of an e-retail enterprise), the types of relationships involved ("sells", "has-in-stock", "purchased", etc.), and the specific data sources 140 from which training data for the machine learning problem can be obtained (e.g., the names/locations of database tables, files, etc.). The data sources may, for example, comprise event records (e.g., records of purchased transactions, item returns, delayed item deliveries, on-time deliveries, publishing of reviews/ratings, etc.) in some cases. In at least some embodiments, the client may also indicate rules for deducing the relationships from the raw data contained in the data sources—e.g., a rule indicating how a particular purchase transaction record can be parsed to identify the source of the product, the consumer of the product, and the item(s) that were purchased may be indicated.

The information about the entity types and the relationship types may be stored in respective repositories for entity type metadata 153 and relationship type metadata 154 in the depicted embodiment. A graph representation of the source data set, comprising a plurality of nodes and a plurality of edges, may be generated by one or more graph generators 152 of the MLS 102, using the supplied details about the source data, the entity type metadata and relationship type metadata in various embodiments. A node of the graph may represent an instance of an entity type, while an edge between a pair of nodes may represent a relationship of a relationship type. In at least some cases, depending on the problem being addressed and the records available in the source data set, a given node may have multiple incident edges representing the participation of the entity represented by the given node in several different logical relationships. For instance, in a scenario in which predictions regarding an e-retail website are to be generated, relationships represented in the graph may include (a) a has-purchased-from relationship between an item consumer and an item source, (b) a has-in-stock relationship between an item and an item source, (c) a has-rated-source relationship between an item consumer and an item source, (d) a has-reviewed-item relationship between an item consumer and an item, (d) a sells relationship between an item source and an item, (e) a has-purchased relationship between an item consumer and an item, (f) a has-clicked-on-link relationship between an item consumer and an item, (g) a same-item-category relationship between one item and another item, or (h) a similarity-score relationship between one item and another item.

An initial feature set (e.g., comprising one or more feature vectors representing characteristics/properties of the entity instances) may be obtained for at least some nodes of the generated graph in the depicted embodiment. In some cases, a client may transmit the initial feature set programmatically to the MLS 102, or provide an indication of a data source from which the feature sets can be obtained. In other embodiments, the client may send a programmatic indication of a workflow or methodology to be used to obtain the initial feature set, and one or more feature set extractors 150 of the MLS 102 may execute or implement the workflow to obtain the features. The methodologies to generate the feature vectors may utilize one or more machine learning algorithms or models in some cases, e.g., feature set extraction algorithms 125 of an algorithm library 120 of the MLS 102 may be used. Various types of properties of the entity instances may be indicated in the initial feature sets in different embodiments. For example, in an e-retail website scenario, initial feature sets for items may indicate, among others: item titles, descriptions, bullet points summarizing the items, item ratings, review text, image quality, brand, item categories and subcategories defined within the e-retail catalog, historic return rates of the items, availability history etc. Depending on the particular problem being solved, different feature vectors may be generated for the same entity type in some embodiments. For example, in a scenario in which the probability of an item being returned to an item source is to be predicted, the initial feature set for the item source may include the source's rating, feedback received regarding the source, tenure (how long the source has been supplying items), location, past returns and concessions, current offers/promotions, units sold, and so on. In contrast, in a scenario in which the probability of a particular payment method being used is to be predicted, the initial feature set for item sources may comprise other combinations of properties, such as historical payment success rate for items sold by the source, rates at which different types of payments were used for the source's items over various trailing time intervals (15 days, 30 days, 90 days, etc.) and so on.

Using the graph representation of the data, and the initial feature sets, one or more graph convolutional models (GCNs) may be trained using a multi-entity-type, multi-relationship GCN algorithm 124 for a particular type of prediction on behalf of the client in various embodiments, e.g., by training/evaluation coordinators 174 using training resources 110. In at least some embodiments, the training may be initiated in response to a training request submitted via programmatic interfaces 177. The GCN model may include several hidden layers as well as a final prediction layer. Within the GCN model, a representation of a particular node at a particular hidden layer may be based at least in part on aggregated representations of neighbor nodes of the particular node, as well as on the representation of the particular node itself from a previous hidden layer in various embodiments. Thus, information learned about the entity at a given layer depends on information learned about neighbor nodes of the entity, as well as on accumulated information from other layers. In scenarios in which the particular node is has multiple logical relationships of different types, the representations of the neighbor nodes of the particular node may be aggregated at least across (a) a set of one-hop neighbors of the particular node with respect to a first relationship type and (b) a set of one-hop neighbors of the particular node with respect to a second relationship type. A learned embedding corresponding to the particular node, obtained from a final hidden layer of the GCN model, may be used to generate one or more types of predictions with respect to the particular node at the prediction layer of the GCN in various embodiments. In at least some embodiments, the types of predictions required may be mapped in graph terms to problems of link/edge detection, node labeling, edge labeling, and so on.

In at least some embodiments, a client may use programmatic interfaces 177 to submit values for various hyper-parameters to be used for the GCN algorithm 124 on the client's behalf. Such hyper-parameters may include, among others, the dimensionality of initial feature set representations for training the GCN model, the dimensionality of weight matrices used within the GCN model, the "depth" of node neighborhoods to be considered (e.g., the number of edges or hops in the graph) when aggregating information, the loss function to be used, and so on.

After the GCN model has been trained, it may be stored in a repository 114 of the MLS 102 in the depicted embodiment. If and when the client wishes to use the trained model for generating predictions of the desired type, a prediction request may be submitted via programmatic interfaces 177. In response, execution coordinators 175 of the run-time subsystem 170 may utilize model execution resources 132 to run the trained version of the models, and generate predictions 160 pertaining to one or more entity types and/or relationship types. In the e-retail website scenario, for example, the predictions may include, among others: (a) a predicted probability of an occurrence of an item acquisition transaction of a particular type, (b) a predicted probability that a review of an item does not satisfy an acceptability standard (e.g., if the review is abusive or fraudulent in some way), (c) a predicted probability that an item of an inventory will be returned after the item has been purchased, or (d) a predicted probability that a content item will reach a popularity threshold. In at least some embodiments, the generated predictions may be transmitted to one or more downstream systems, where they may trigger automated actions such as (a) modifying displayed content of a web site (e.g., by removing reviews identified as illegitimate or abusive, removing an item from a search result list based on the predicted likelihood that it will be returned, etc.), (b) presenting one or more promotional offers pertaining to an e-retail web site (e.g., a discount for the use of a preferred payment method), or (c) a change to a fulfillment or delivery plan for one or more items or (d) a transfer of one or more items to meet an anticipated demands. Various components of the MLS 102, including the training subsystem 130, the run-time subsystem 170, the interaction interface managers 155, and the repository 114 may each comprise some combination of hardware and software of one or more computing devices in the depicted embodiment.

Simple Example Graph

Figure 2:
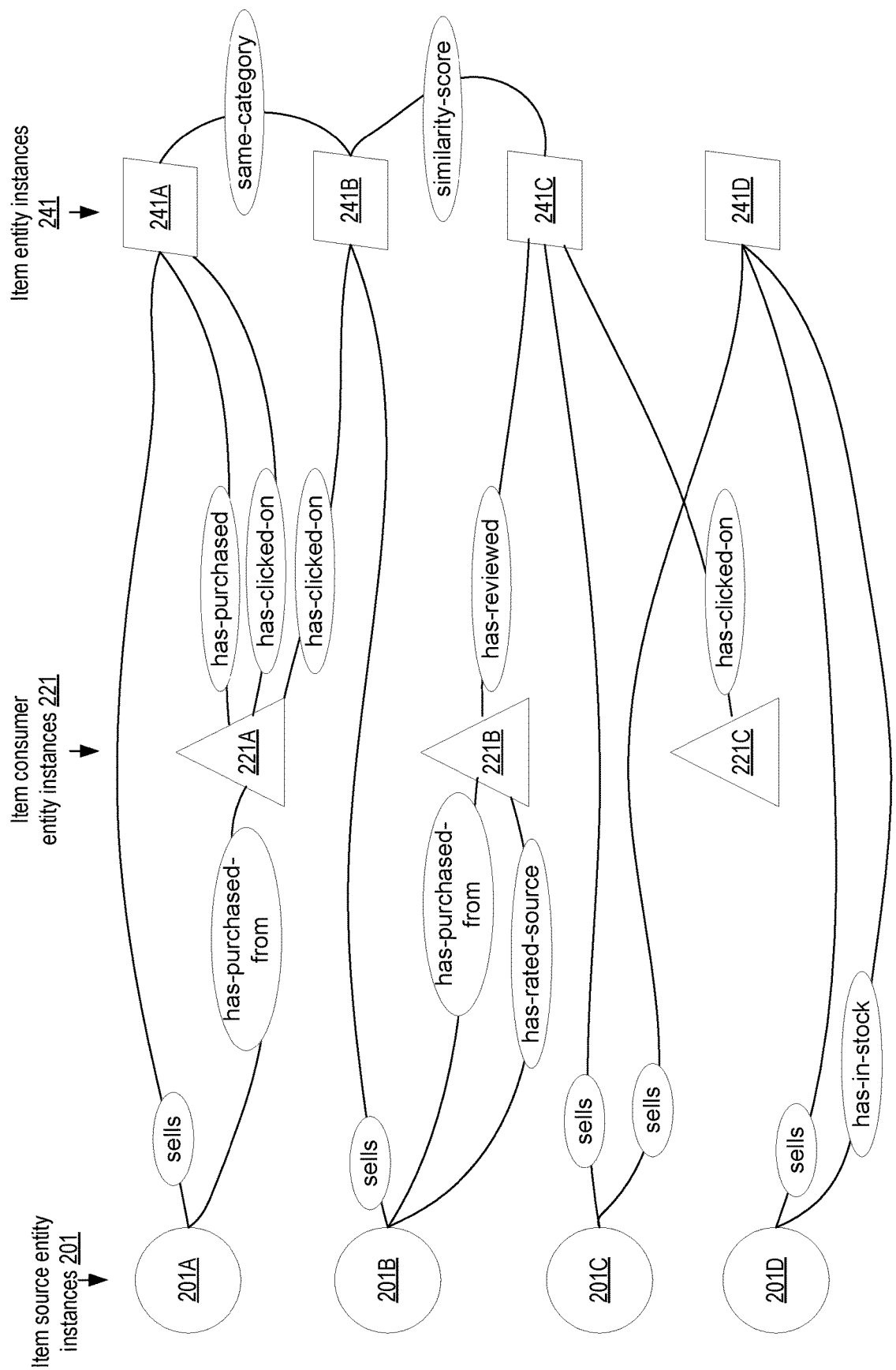
FIG. 2 illustrates a simple example of a graph representing several entity types associated with an e-retail environment, according to at least some embodiments.

To help provide explain the benefits and uses of graph convolutional networks, it may be helpful to begin by providing trivial examples of data sets which may be represented using graphs. FIG. 2 illustrates a simple example of a graph representing several entity types associated with an e-retail environment, according to at least some embodiments. In the example presented in FIG. 2, instances of three entity types are shown: item sources 201 (also referred to as sellers or providers), item consumers 221, and items 241. Circles represent item sources, triangles represent consumers, and parallelograms represent items. Edges between these three types of nodes represent relationships between the corresponding instances.

One of the relationship types represented in FIG. 2 is the "sells" relationship, indicating that an item source sells a particular item. Item source 201A sells item 241A, item source 201B sells item 241B, item source 201C sells items 241C and 241D, and item source 201D sells item 241D. If the data available indicates that a given item source such as 201D has a particular item such as 241D currently in stock, an edge indicating a "has-in-stock" relationship may link the nodes for the item source and the item which is in stock. Thus, more than one type of relationship (e.g., "sells" and "has-in-stock") may be represented between a given pair of nodes (item source 201D and item 241D).

Some relationships may be represented between different nodes of a given entity type—e.g., a "same-category" relationship exists between items 241A and 241B (both of which belong to the same item category), and a "similarity-score" relationship exists between item 241B and 241C (indicating that a similarity score has been computed for these two items).

Item consumers 221 may be represented as having several different kinds of logical relationships in the depicted example, including some relationships with items and others with item sources. The edge linking consumer 221A to source 201A indicates that consumer 221A has purchased some item (e.g., item 241A) from source 201A. Similarly, a "has-purchased" edge linking nodes 221A to 241A indicates that item 241A has been purchased by consumer 221A. A "has-clicked-on" relationship edge indicates that a consumer has clicked on a link, web image or web page representing an item. A "has-rated-source" relationship edge indicates that a consumer has provided a rating (e.g., via a web-based interface) for an item source, while a "has-reviewed" relationship edge indicates that an item consumer has provided a review (e.g., a text review, or a multi-media review including images, text, videos, etc.) for an item. A rich variety of relationship information may be captured for numerous types of entities by constructing graphs of the kind shown in FIG. 2, and used to generate predictions regarding the represented entities (as well as entities that were not represented in the training data) and relationships.

Basic Graph Convolutional Network Concepts

FIG. 3 illustrates basic graph convolutional network (GCN) concepts using a simple single-entity-type, single-relationship-type graph, according to at least some embodiments. Example graph 301 comprises six nodes labeled 1 through 6, with edges between node pairs (2,6), (6,4), (2,5), (5,1), (3,4) and (2,3) representing the single relationship type being considered. A GCN model (of which a portion 310 is shown in FIG. 3) with two hidden layers may be constructed for graph 301, with the weights learned at each layer being represented by a weights matrix $W^1$ (for layer 1) and $W^2$ (for layer 2).

The initial feature sets for each of the six nodes may be represented as respective vectors $x_1, x_2, \ldots, x_6$ in the GCN model. Layer j's representation (also referred to as an internal or hidden representation) for a given node k (such as target node 6, for which a portion of the GCN is shown in FIG. 3) is represented using the notation $h^{j,k}$, while the notation $h^{p,N(q)}$ is used to represent the aggregated information about 1-hop neighbors of node q at layer p.

As shown in the GCN model portion 310, the internal representation of a given node at a given layer is based on (a) the same node's representation in the previous layer (e.g., $h^{2,6}$ is shown as being influenced by $h^{1,6}$ as indicated by label 351) and (b) an aggregated representation of 1-hop neighbors of the node (e.g., $h^{2,6}$ is also shown as being influenced by $h^{2,N(6)}$ as indicated by label 352). For each layer, a respective convolutional module (represented by the shaded rectangles) comprising some number of artificial neurons may be used for each node, with the details of the module architecture dependent on the neighborhood of the node. However, the parameters for all the modules at a given layer may be common in the GCN model, thus keeping the parameter complexity of the model limited. The internal representation of a node may be initialized to the initial feature set for the node (as indicated by the notation $h^{0,4}=x_4$ and the like). Common transformation functions/matrices (indicated, for example, by the rectangles on the inbound arrows to $h^{1,N(2)}$) may be applied to the input feature sets to generate the first level of neighborhood information.

The aggregated neighborhood representation $h^{2,N(6)}$ is shown as being obtained using layer 2 convolutional modules applied to the immediate (1-hop) neighbors of node 6 (i.e., nodes 2, 1 and 4 in the graph 301). The internal representations, at layer 1, of each of the neighbor nodes 2, 1 and 4 are in turn also derived using convolution modules (of layer 1) applied to the set of neighbors of each of these nodes. Thus, because node 2 is linked by a single hop to nodes 6 and 5, $h^{1,N(2)}$ is influenced by nodes 6 and 5 at layer 1, and similarly $h^{1,N(1)}$ is influenced by nodes 3 and 5, and $h^{1,N(4)}$ is influenced by nodes 3 and 6. In this way, the influence of all the 1-hop neighbor nodes is taken into account at each layer to generate the internal representations of the different nodes, and the accumulation of multiple layers results in propagating neighborhood information from more distant parts of the graph. The number of neurons used for each of the convolution modules may be dependent on the dimensionality of the weight matrices being learned.

Mathematically, equations similar to the following may be used to indicate how internal representations of the nodes are generated, with f, s and g representing non-linear functions corresponding to portions of the GCN:

// Equation E1: aggregation of neighborhood information for a node at a layer p:

$$h^{p,N(q)} = f(\{h^{p-1,v} \text{ for all neighbors } v \text{ in 1-hop neighborhood } N(q) \text{ of node } q\}) \quad \text{E1}$$

// Equation E2: representation of a node is based on aggregated neighbor information,
// as well as previous layer's representation of the same node $$h^{j,k} = s((W^j \cdot g(h^{j-1,k} h^{j,N(k)}))) \quad \text{E2}$$

The final internal representations $h^{j,k}$ for the kth layer may be normalized using any of various normalization techniques in various embodiments. The normalized internal representation at the final hidden layer (e.g., layer 2 in the example shown in FIG. 3) may represent the final embedding of the various nodes, which may then be used as input for a prediction layer of the GCN (not shown in FIG. 3) in various embodiments.

Extensions of GCNs to Multi-Relationship-Type, Multi-Entity-Type Scenarios

Before proceeding to a discussion of the extension of the basic GCN equations E1 and E2 to cover multiple relationship types and multiple entity types, it may be helpful to demonstrate how the total number of relationship types may grow with just a few entity types being taken into consideration. FIG. 4 illustrates examples relationship types which may be modeled for a collection of three entity types, according to at least some embodiments. In the depicted embodiment, three entity types 450 are represented by records of a data set: item sources 401, item consumers 421, and items 441.

A total of six entity-type-pair combinations 452 may be generated for representing pairwise logical relationships from the three entity types (ignoring possible semantics regarding the directionality of relationships): source-source relationships, source-consumer relationships, source-item-relationships, consumer-consumer relationships, consumer-item relationships, and item-item relationships.

In some cases, a logical relationship may have directional semantics, further increasing the number of different relationship types which may be represented in a graph used for a GCN. For example, an item source may provide a rating for an item consumer based on interactions with the consumer, and the consumer may also generate a rating for the item source based on the consumer's interpretations of the same interactions. As a result, as indicated in block 440, a "has-rated-as-consumer" relationship may be modeled between sources and consumers, while a "has-rated-as-source" relationship may be modeled between consumers and sources.

In at least some cases, multiple relationship types (whether directional or not) may exist between entities of a given pair of entity types. Thus, as shown in block 445, relationships between sources and consumers may include "has-rated-as-consumer", "has-sold-to" (indicating that the source has sold an item to the consumer), and "has-granted-premier-status-to" (indicating that the source has granted special status to the consumer, e.g., due to multiple purchases and the like).

Taking all the different combinations similar to those illustrated in FIG. 4 into account, a very large number of logical relationship types may be captured for a relatively small number of entity types in various embodiments, potentially enabling a rich set of inferences to be drawn regarding the interactions between entity instances.

Figure 5:
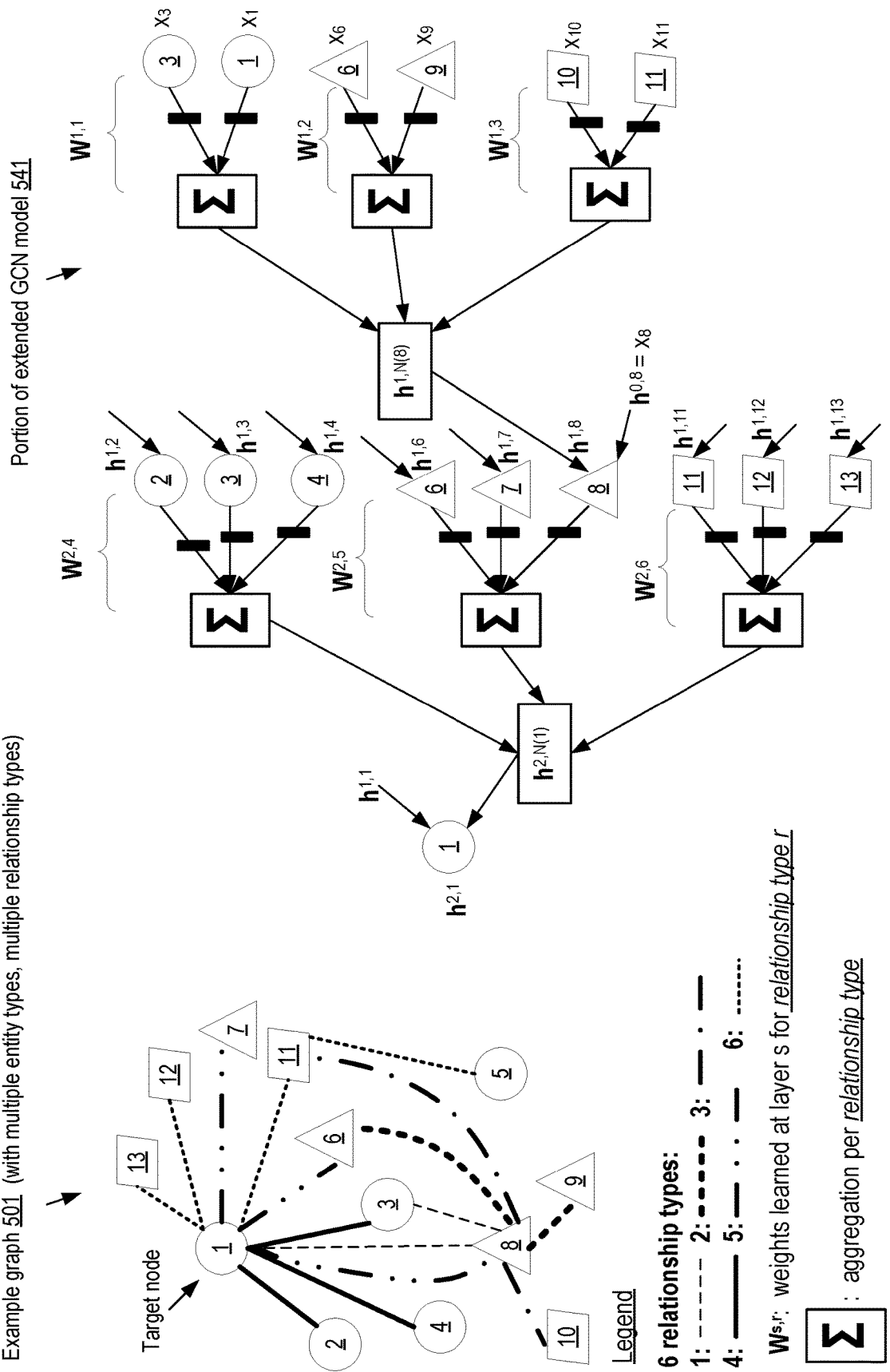
FIG. 5 illustrates the extension of GCN concepts to a multiple entity type and multiple relationship type context, according to at least some embodiments.

The basic GCN discussed in the context of FIG. 3 did not take different relationship types into account. FIG. 5 illustrates the extension of GCN concepts to a multiple entity type and multiple relationship type context, according to at least some embodiments. In the example graph depicted in FIG. 5, there are three types of nodes (representing respective entity types), and 6 relationship types as shown in the legend. Nodes 1, 2, 3, 4 and 5 represent respective instances of a first entity type; nodes 6, 7, 8 and 9 represent a second entity type; and nodes 10, 11, 12 and 13 represent a third entity type.

A portion of an extended GCN model 541 corresponding to graph 501, with node 1 as the target node being considered) is also shown in FIG. 5. To extend the basic GCN concepts discussed in the context of FIG. 3 to the wider multi-relationship-type context, neighborhood information is captured with respect to each relationship type separately. Pseudo-code for two types of tasks performed using a GCN model (similar to model 541) which has been extended to incorporate multiple relationship types is provided below, in the form of procedures GenerateEmbeddings (which produces the final embeddings using a k-layer GCN model) and Classify (which used the final embeddings to generate class labels for nodes or edges, depending on the use case). Note that the dimensionalities of the various vectors and matrices (e.g., the x vectors, the z vectors, the W matrices, etc.) represent hyper-parameters of the GCN model. In at least some embodiments, clients on whose behalf such models are generated at a machine learning service may provide preferred values of at least some of the hyper-parameters via programmatic interfaces.

```
Start pseudo-code of example GCN algorithm
1:   Inputs:
2:      Graph G = {V, E} // V is a set of n nodes representing entity
        instances,
3:          // E is a set of edges representing relationships
4:      Initial feature sets (vectors): x₁, x₂, . . . xₙ
5:      Number of GCN layers: K
6:      N^{i,r}: set of 1-hop neighbors of node vᵢ under relationship r
7:      V_train/E_train: set of training labels for nodes/edges
8:      φ: a non-linear function
9:   Outputs:
10:     V_test/E_test: set of labels predicted for test nodes/edges
11:  procedure GenerateEmbeddings:
12:     h^{0,v} = x_v, ∀ v ∈ V  // initialize node representations using initial
        feature sets
13:     for k in 1 to K do      // for each layer of K layers
14:        for v in V do         // iterate over all nodes
15:           h^{k+1,v} = φ (Σ_r Σ_{j∈Ni,r} n^{ij,r} W^{k,r} h^{k,j} + n^{k,i} h^{k,i}) // update node
              embedding
16:           // n^{ij,r} and n^{k,i} are normalization constants based on
              neighborhood size:
17:           // n^{ij,r} = 1/(|N^{i,r}||N^{j,r}|)^{1/2}, n^{k,i} = 1/(|N^{i,r}|)^{1/2}
18:        h^{k,v} = h^{k,v} /||h^{k,v}||₂ ∀ v ∈ V          // normalize embedding
19:        z_v = h^{K,v}, ∀ v ∈ V    // z_v is the final learned embedding of
           node v
20:  procedure Classify:
21:     if Node Classification then
22:        l_i = softmax(Y^T z_i) ∀ i in V_test // predict node labels,
23:           // Y is learned weight matrix of prediction layer
23:     else if Edge Prediction then
24:        l_{ij,r} = softmax (Y_r^T concat[z_i, z_j]) ∀ (i, j, f) ∈ E_test
25:           // Y_r is learned weight matrix of prediction layer
              for relationship r
End pseudo-code of example GCN algorithm
```

The inputs of the GCN model are listed in lines 1 through 8 of the pseudocode, and include the graph (which includes neighbor information for each type of relationship), training labels for s subset of the nodes/edges, initial feature sets x, and the number of layers K of the model; the convolution process of the GCN model is represented simply as a non-linear function φ.

In the GenerateEmbeddings procedure, the internal representations or embeddings of the nodes are initialized to the initial feature vectors (line 12). Logic corresponding to lines 14-18 is then implemented for each layer of the GCN model (as indicated by the for statement in line 13). This logic, which may be implemented in parallel for different nodes in some implementations, comprises generating a hidden representation for a given node based on (a) weight matrices $W^{k,r}$ which are relationship-type-specific, aggregated neighbor information for each type of relationship separately (as indicated by the double summation term of line 15) and (b) the hidden representation of the given node from the previous layer. Line 15 of the pseudocode in effect represents the extension of the combination of equations E1 and E2 to the multiple relationship type context.

FIG. 5 illustrates the logic of line 15 using the specific example graph 501 and a specific node (the target node labeled 1). Although arrows are hot shown on the lines representing relationships in graph 501 to avoid clutter, the relationships are directional. When considering the relationships of node 1 with other nodes, the following nodes are identified as (directional) 1-hop neighbors as shown in GCN model 540: nodes 2, 3 and 4 (relationship type 4 in the legend), nodes 6, 7 and 8 (relationship type 5), and nodes 11, 12 and 13 (relationship type 6). Even though a second edge (relationship type 1) is shown between nodes 1 and node 8, this is counted as a relationship from node 8 to node 1, so node 8 does not have to be considered a 1-hop neighbor twice. As shown, the representation for node 1 at layer 2 of the GCN ($h^{2,1}$) is based on combining information from the previous layer for the same node ($h^{1,1}$), as well as aggregated neighborhood information for all the three different relationship types (type 4, type 5 and type 6), with the neighborhood information being aggregated separately per relationship type. Thus, because nodes 2, 3 and 4 are the only 1-hop neighbors of node 1 according to relationship 4, their contributions are aggregated separately from those of nodes 6, 7 and 8 (which are 1-hop neighbors according to relationship type 5), and also separately from those of nodes 11, 12 and 13 (which are neighbors according to relationship type 6). Similarly, when considering the representation of node 8, the 1-hop neighbors of node 8 for each type of relationship are treaded separately: nodes 1 and 3 are neighbors of node 8 with respect to relationship type 1, nodes 6 and 9 are neighbors of node 8 under relationship type 2, and nodes 10 and 11 ate neighbors of node 8 under relationship type 3. A separate convolutional module may be learned for each relationship type at each layer in the depicted example.

As shown in the Classify procedure of the pseudocode, the predictions generated by the GCN model comprise class labels for nodes and/or edges which are currently unlabeled, using the final embeddings $z_v$ generated at the Kth layer of the model and weight matrices Y for the prediction layer of the model (which is not shown in FIG. 5). The logic of the Classify procedure may be implemented using a filly connected neural network layer in at least some embodiments, with the number of neurons in that layer dependent on the kind of problem which is being addressed (e.g., for classification among C classes, the fully-connected layer may comprise C neurons). Note that in some cases, the model may be used to generate labels for unlabeled nodes/edges which were already part of the graph used in the training of the model; in other cases, the model may be used to generate labels for new nodes and/or predict new labeled edges (which were not part of the original graph). Two broad types of problems are shown as being addresses in the Classify procedure: node classification and edge prediction. In the edge prediction case, the model may generate probabilities, for a given pair of nodes, of the existence of edges of any of the different types of relationships being modeled in various embodiments. Thus, for example, if there are ten types of relationships being represented, ten probabilities may be predicted for any given pair of nodes, each one corresponding to the probability of existence of an edge representing a different type of relationship. Note that the final prediction layer may not necessarily perform classification in some embodiments; instead of classifying nodes or edges, for example, regression may be implemented at the final layer, in which a numeric value (say between 0 and 1) is generated for each node or edge instead of classifying nodes or edges. One of the benefits of using GCNs is that high quality predictions may be generated even with very limited labeled data, thus helping overcome the so-called "cold start" problem.

Examples of Prediction Problems Addressable Using GCNs

FIG. 6 illustrates three example types of prediction problems which may be addressed using GCNs, according to at least some embodiments. It is noted that while the examples shown in FIG. 6 are associated with an e-retail or e-commerce context, the GCN-based techniques introduced above may be used with equal success in various other contexts (for example, to predict popularity of content items such as films or television shows, to predict the success of medical treatment procedures, and so on).

In abusive source/reviewer detection 601, the required prediction type 612 A comprises identifying item sources or reviewers who have violated the rules or norms of the reviewing/rating procedures made available at an e-retail web site. The entity types 605A which are modeled include item sources, item reviewers, and items. In at least some embodiments, the reviews may be accompanied by a "star" rating (or a similar rating scheme) in which a reviewer chooses a rating between 1 and 5 stars (e.g., which 5 stars the best possible rating, and 1 star the worst possible rating). In addition to capturing the star rating, information about the timing of the rating (e.g., relative to the purchase of an item from a source by a reviewer) may also be captured and included in the relationship information. Thus, the total number of relationship types may be the product of the number of rating levels (e.g., 5 for 1-star to 5-star ratings, with no partial stars being allowed), and the number of timing ranges being considered. Item sources may abuse the system by inducing invalid or "fake" reviews. The output of the GCN used for scenario 601 may comprise labels identifying previously unlabeled reviews as abusive versus non-abusive in the depicted embodiment.

In scenario 621, the objective 612B of the GCN may comprise predicting whether a purchase of an item is likely to be completed using a particular type of electronic payment option (e.g., a credit card, a debit card, a phone-based payment service, etc.). The entity types 605B modeled in this scenario may include item sources, item purchasers and items, and purchase relationships 611B may be the only relationships modeled. The GCN may be used to predict the probability of a particular type of electronic payment for a specified (source, purchaser, item) triplet.

In scenario 641, the GCN may be used to predict the probability 612C that an item, if sold, is subsequently returned (e.g., due to dissatisfaction with the item). The entity types 605C modeled may include item sources and items, and the relationship type 611C modeled may be the "offers-item" relationship. In each of the three cases, a client of a machine learning service (similar in features and functionality to MLS 102 of FIG. 1) at which GCN algorithms similar to those discussed above may specify the prediction objectives, the entity types, the relationship types, the input data sets, and techniques to be used to obtain initial feature sets via programmatic interfaces to the service, and the service may then automate the process of training the GCN models.

Example Programmatic Interactions

Figure 7:
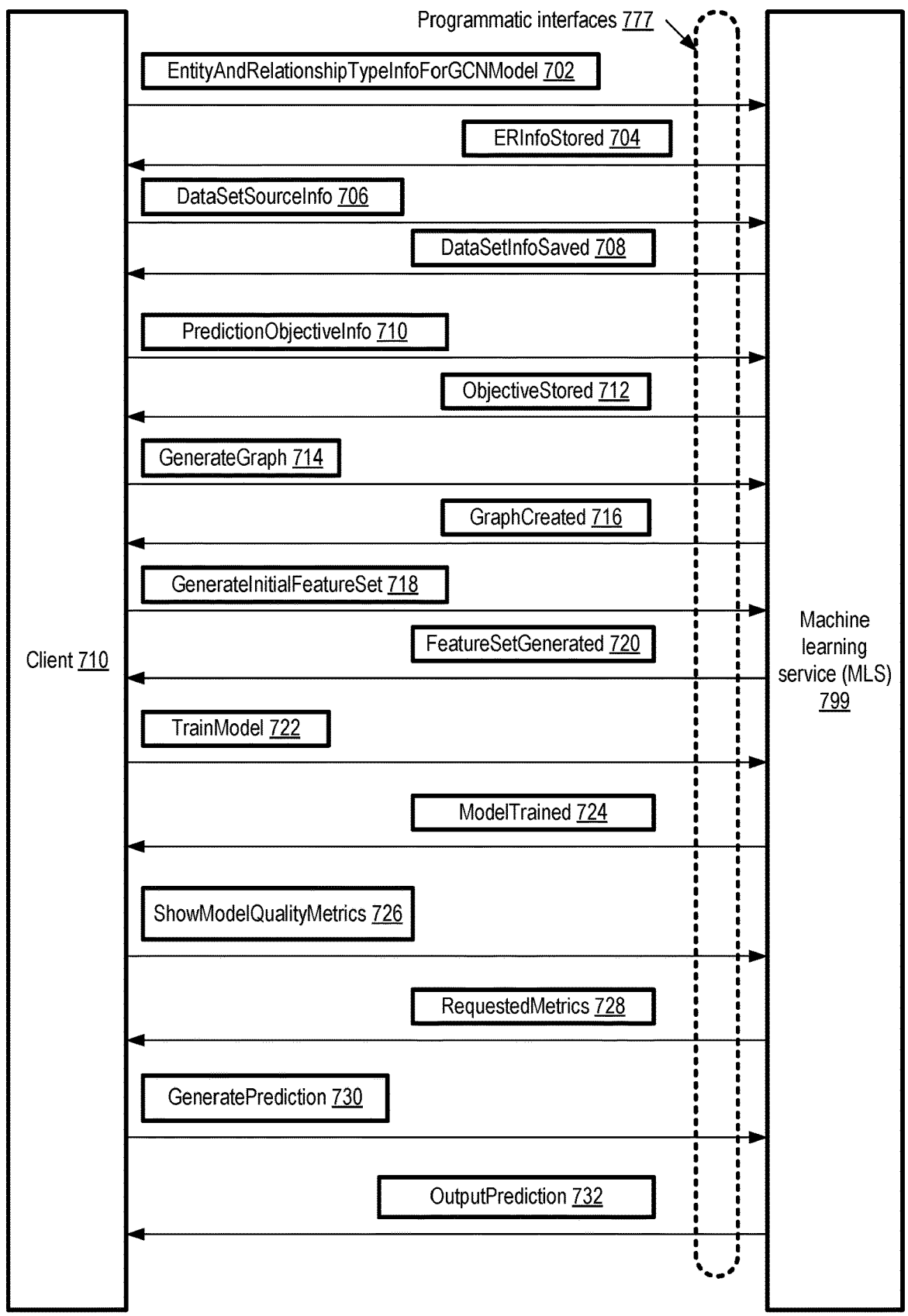
FIG. 7 illustrates example programmatic interactions between a client and a machine learning service, according to at least some embodiments.

FIG. 7 illustrates example programmatic interactions between a client and a machine learning service, according to at least some embodiments. A machine learning service (MLS) 799 which supports the training and execution of multi-entity-type, multi-relationship-type GCN models, similar in features and functionality to MLS 102 of FIG. 1, may implement one or more programmatic interfaces 777 in the depicted embodiment, enabling clients 710 to submit various requests pertaining to the models, and to receive corresponding responses. The programmatic interfaces may include, among others, a set of application programming interfaces (APIs), web-based consoles, command-line tools, graphical user interfaces, and the like in different embodiments.

Using the programmatic interfaces 777, a client 710 may submit an EntityAndRelationshipTypeInfoForGCNModel message 702 to the MLS 799, specifying the types of entities and relationships for which a GCN model of the kind discussed above is to be generated. In response, the MLS may store the type information in a repository and send an ERInfoStored message 704 to the client.

Information about the data set sources from which training data for the GCN model is to be obtained may be submitted via a DataSetSourceInfo message 706 by a client 710. The data set information may be stored at the MLS, and a DataSetInfoSaved message 708 may be sent in response in the depicted embodiment.

The client may indicate the specific types of predictions to be generated via a PredictionObjectiveInfo message 710 in some embodiments. After the information about the kind of predictions desired is stored, an ObjectiveStored message 712 may be sent to the client in such embodiments.

A graph may be generated from the specified data set, based on a specified or inferred set of rules for extracting nodes and edges from the data set, in response to a GenerateGraph request 714 in the depicted embodiment. After the graph is created, a GraphCreated message 716 may be sent to the client in some embodiments.

To cause the MLS 799 to generate an initial feature set, a GenerateInitialFeatureSet message 718 may be transmitted by a client 710 via the programmatic interfaces 777 in the depicted embodiment. In response, a workflow specified by the client (e.g., within the GenerateInitialFeatureSet message itself, or in a separate programmatic interaction), which may itself involve the use of one or more machine learning models other than the GCN model, may be executed to extract the initial features for the nodes of the graph from a specified data source. A FeatureSetGenerated response message 720 may be sent to the client after the feature sets have been generated in at least one embodiment. In some embodiments, the MLS 799 may provide a set of feature generation models as options to clients, and clients may select one or more models from among the provided options if desired.

The client 710 may submit a TrainModel request 722 to initiate the training of the GCN model in the depicted embodiment. In some embodiments, values of one or more hyper-parameters to be used during training may be specified by the client in the request, such as the dimensionality of the initial feature vectors, the dimensionality of one or more weight matrices, the number of neighbor layers to be considered, the loss function to be used, mini-batch sizes, and so on. After the model is trained and the trained version is stored at the MLS, a ModelTrained message 724 may be sent back to the client in at least one embodiment.

The client may request to see one or metrics indicative of model quality, e.g., by submitting a ShowModelQualityMetrics request 726 in at least one embodiment. In response, the requested metrics (e.g., receiver operating characteristic or ROC metrics if the GCN model was being used for classification, mean squared error metrics or mean average percentage error (MAPE) metrics if the GCN model was being used for regression, and so on) may be displayed for the trained version of the model via one or more RequestedMetrics messages 728.

When the client wishes to obtain a prediction, e.g., for a set of new nodes (or for nodes/edges which were already present in the graph but were unlabeled), a GeneratePrediction request 730 specifying the targeted nodes may be submitted. In response the MLS may execute the trained version of the model, obtain the generated predictions and send one or more OutputPrediction response messages 732 to the client. It is noted that other types of programmatic interactions than those shown in FIG. 7 may be supported in at least some embodiments. In one embodiment, for example, contents of several of the client-submitted message types shown separately in FIG. 7 may be combined into a single submitted message, for example, and the corresponding responses may also be combined into a single message.

Example Provider Network Environment

Figure 8:
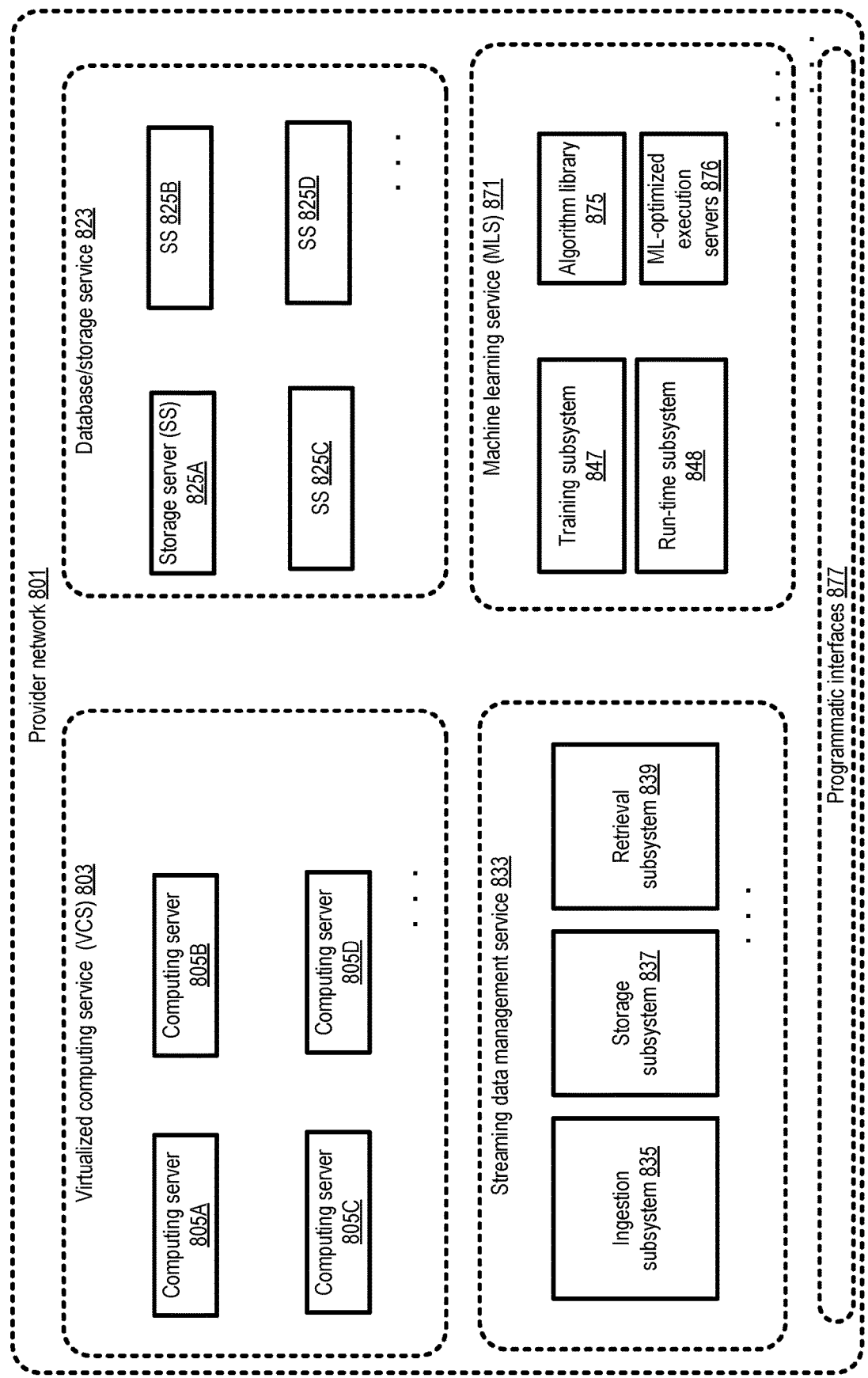
FIG. 8 illustrates an example provider network environment in which a machine learning service may be implemented, according to at least some embodiments.

In at least some embodiments, a machine learning service at which GCN-based are trained and executed may be implemented as part of a suite of services of a provider network. FIG. 8 illustrates an example provider network environment in which a classification service may be implemented, according to at least some embodiments. Networks set up by an entity such as a company or a public sector organization to provide one or more network-accessible services (such as various types of cloud-based computing, storage or analytics services) accessible via the Internet and/or other networks to a distributed set of clients may be termed provider networks in one or more embodiments. A provider network may sometimes be referred to as a "public cloud" environment. The resources of a provider network, or even a given service of a provider network, may in some cases be distributed across multiple data centers, which in turn may be distributed among numerous geographical regions (e.g., with each region corresponding to one or more cities, states or countries).

In the depicted embodiment, provider network 801 may comprise resources used to implement a plurality of services, including for example a virtualized computing service (VCS) 803, a database/storage service 823, and a streaming data management service 833 as well as machine learning service (MLS) 871 similar in features and capabilities to machine learning service 102 of FIG. 1. The machine learning service 871 in turn may comprise at least a training subsystem 847, a run-time subsystem 848 and an algorithm library 875. The streaming data management service 833 may be used for managing ongoing streams or sequences of data records (generated for example at various types of sensors, logging subsystems of other services or applications, and so on). The streaming data management subsystem may include an ingestion subsystem 835 responsible for obtaining records of data streams, a storage subsystem 837 responsible for coordinating the persistent and efficient storage of the records, and a retrieval subsystem 839 allowing clients to access the stored records.

Components of a given service may utilize components of other services in the depicted embodiment—e.g., for some streaming data management tasks, a component of the streaming data management service 871 may utilize virtual machines implemented at computing servers such as 805A-805D of the virtualized computing service 803, the records of the data streams may be stored at storage servers 825 (e.g., 825A-825D) of storage service 823, and so on. Individual ones of the services shown in FIG. 8 may implement a respective set of programmatic interfaces 877 which can be used by external and/or internal clients (where the internal clients may comprise components of other services) in the depicted embodiment.

Resources of other services, such as computing servers 805 or storage servers 825 may be used to perform some of the computations involved in model training and execution at the machine learning service 871, and/or to store input data or results of models—e.g., one or more of the data sources from which event records of a source data set are retrieved may comprise resources of the database/storage service 823. The storage service 823 and/or the VCS 803 may each provide high levels of availability, data durability, and failure resilience. In various embodiments, algorithms obtained from algorithm library 875, including GCN-based algorithms of the kind discussed earlier, may be used for various aspects of model training, initial feature set generation, and the like. In some embodiments, execution servers 876 that are optimized specifically for machine learning algorithms may be employed for model training and/or execution. In at least one embodiment, the input data sets for GCN-based models may include event records collected at the streaming data management service 833.

In some embodiments, the GCN-based techniques for generating predictions regarding relationships and entities may be implemented without acquiring resources of network-accessible services such as those shown in FIG. 8. For example, a standalone tool implemented at one or more computing devices which are not part of a network-accessible service may be used in some embodiments.

Methods for Using GCNs

Figure 9:
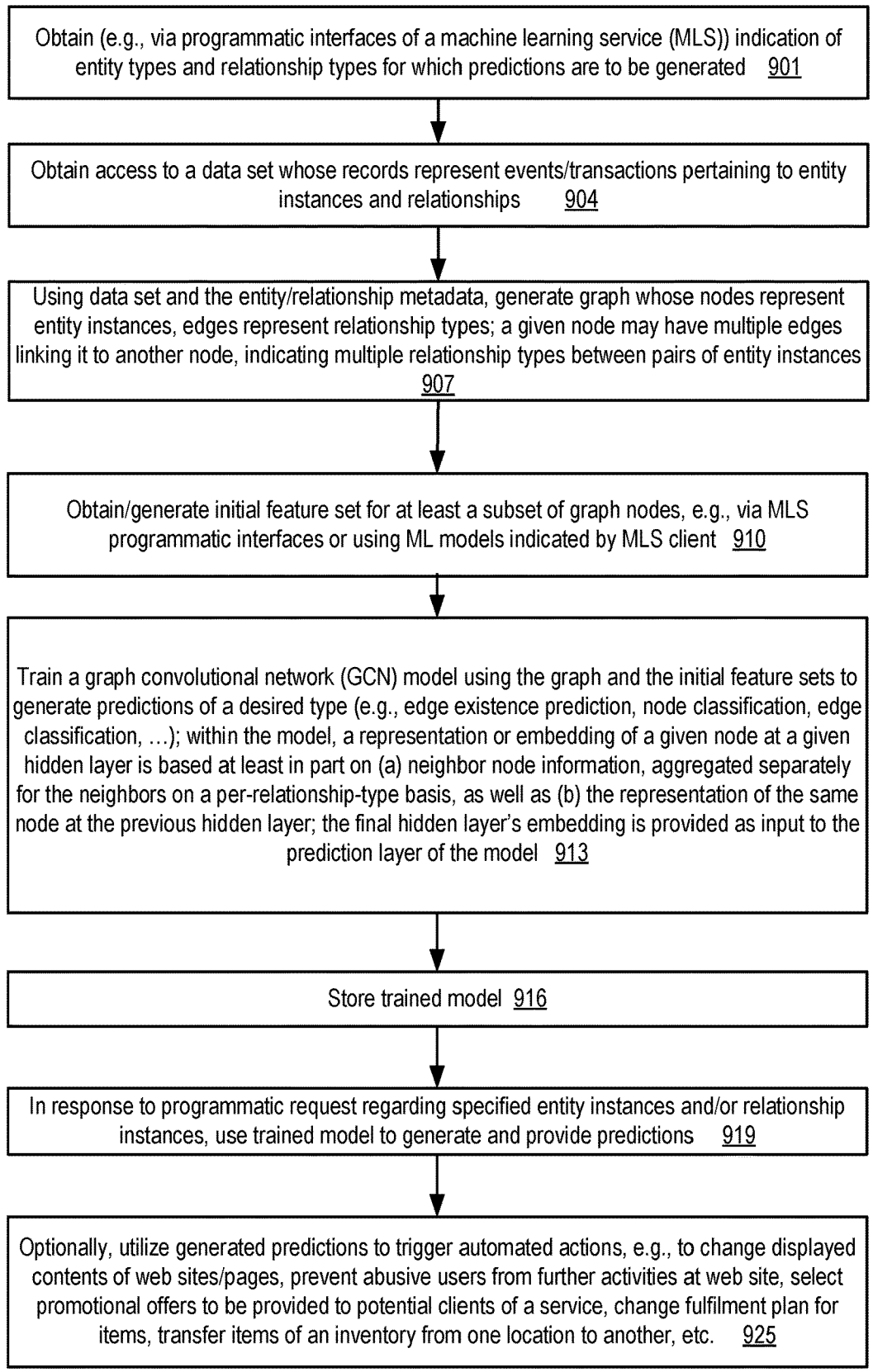
FIG. 9 is a flow diagram illustrating aspects of operations that may be performed to train and utilize GCN models to analyze multi-relationship-type multi-entity-type data, according to at least some embodiments.

FIG. 9 is a flow diagram illustrating aspects of operations that may be performed to train and utilize GCN models to analyze multi-relationship-type multi-entity-type data, according to at least some embodiments. As shown in element 901, an indication of a collection of entity types and relationship types for which one or more types of predictions are to be generated may be obtained via programmatic interfaces, e.g., at a machine learning service similar in functionality and capabilities to machine learning service 102 of FIG. 1.

Access to a data set whose records represent events/transactions pertaining to instances of the entity types and relationship types may also be obtained in at least some embodiments (element 904). Using the data set as well as the entity and relationship information, a graph comprising a plurality of nodes and edges may be generated (element 907). The nodes may represent instances of the entity types, while an edge between a pair of nodes may indicate a relationship between the instances represented by the nodes. A given node may have multiple edges linking it to another node in at least some embodiments, indicating that relationships of multiple types exist between entity instances represented by a pair of connected nodes.

An initial feature set for at least a subset of the graph nodes may be obtained or generated (element 910). In some cases the feature sets may be provided via programmatic interfaces by the clients of the machine learning service on whose behalf the GCN-based model is being prepared; in other cases, the client may provide an indication of a workflow to be used to extract the feature sets from one or more data sets, and the machine learning service may execute the workflow on behalf of the client. In some embodiments, one or more machine learning models (i.e., different models from the GCN model) may be executed to extract the initial feature sets.

Using the initial feature sets and the graph, a graph convolutional network model may be trained to generate predictions of a desired type (element 913). The model may comprise a plurality of hidden layers and a prediction layer. A representation or embedding of a particular node at a particular hidden layer of the model may be based at least in part on aggregated representations of neighbor nodes of the particular node, as well as on the representation of the particular node at the previous layer. The representations of the neighbor nodes may, for example, be aggregated at least across (a) a set of one-hop neighbors of the particular node with respect to a first relationship type and (b) a set of one-hop neighbors of the particular node with respect to a second relationship type. The learned embedding corresponding to the particular node, obtained from a final hidden layer of the GCN model, is provided as input to a prediction layer of the GCN model to obtain one or more types of predictions with respect to the particular node. The predictions may be mapped to the graphical domain as predicting classes of nodes, predicting the existence of edges, predicting the classes of edges, and so on, depending on the nature of the problem being addressed.

A trained version of the model may be stored (element 916), e.g., in a repository of the machine learning service. In response to a programmatic request for a prediction regarding specified entity instances and/or relationship instances, the trained version of the model may be used to generate and provide the requested predictions (element 919) in the depicted embodiment. Optionally, the generated predictions may be utilized to trigger one or more types of automated actions (element 925). Such actions may include, for example, changing displayed contents of web sites/pages (e.g., by removing abusive or illegitimate reviews/ratings), preventing abusive users from further activities at a web site, selecting promotional offers to be provided to potential clients of a service, changing a fulfilment/delivery plan for an item, transferring items from one location to another, and so on.

It is noted that in various embodiments, some of the operations shown in FIG. 9 may be implemented in a different order than that shown in the figure, or may be performed in parallel rather than sequentially. Additionally, some of the operations shown in FIG. 9 may not be required in one or more implementations.

Use Cases

The techniques described above, of training and utilizing graph convolution models for obtaining predictions about entities and relationships represented in large data sets may be useful in a variety of scenarios. For example, as mentioned earlier, many types of difficult problems in the e-retail domain, such as quickly detecting misuse of ratings/reviews, may be addressed using such models. In addition, such techniques may be applied in domains such as medicine (where they may be used to detect diseases or find appropriate treatments), finance (where they may be used to detect fraudulent transactions), and so on. The techniques may be applied successfully in any arena in which multiple types of logical relationships exist between instances of multiple entity types.

Illustrative Computer System

Figure 10:
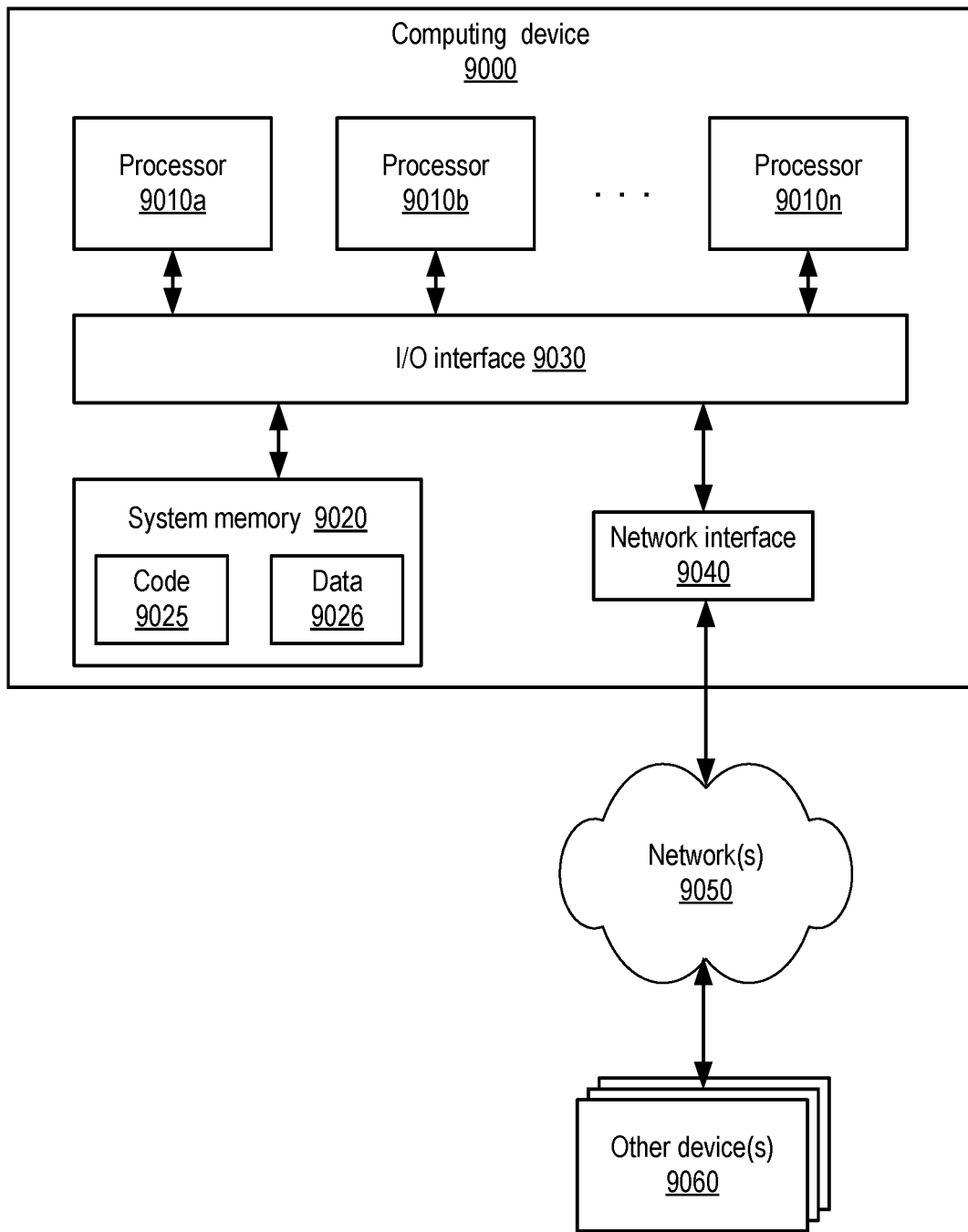
FIG. 10 is a block diagram illustrating an example computing device that may be used in at least some embodiments.

In at least some embodiments, a server that implements one or more of the techniques described herein, including for example components of network-accessible services including machine learning services at which graph convolutional network based models are implemented and the like may include a general-purpose computer system that includes or is configured to access one or more computer-accessible media. FIG. 10 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 9, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 9 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices including one or more respective processors;
wherein the one or more computing devices include instructions that upon execution on or across the one or more respective processors cause the one or more computing devices to:
obtain an indication, via one or more programmatic interfaces, of (a) a plurality of entity types and (b) a plurality of relationship types among the plurality of entity types, wherein the plurality of entity types includes an item type and an item consumer type, and wherein the plurality of relationship types includes an acquisition relationship indicating that an item was acquired by an item consumer;
generate, from a source data set comprising a plurality of records pertaining to instances of the plurality of entity types, a graph representation comprising a plurality of nodes and a plurality of edges, wherein a node of the plurality of nodes represents an instance of an entity type, wherein an edge between a pair of nodes indicates a relationship of a particular relationship type between the respective instances represented by the pair of nodes, and wherein at least one node of the graph is linked to a plurality of other nodes via a respective edge, indicating a plurality of relationships of the entity instance corresponding to the node;
obtain a respective initial feature set for individual ones of the nodes of the graph representation;
train, using the graph representation and the respective initial feature sets, a graph convolutional network model to generate one or more types of predictions, wherein:
a representation of a particular node at a particular hidden layer of the graph convolutional network model is based at least in part on aggregated representations of neighbor nodes of the particular node, wherein the representations of the neighbor nodes are aggregated at least across (a) a set of one-hop neighbors of the particular node with respect to a first relationship type and (b) a set of one-hop neighbors of the particular node with respect to a second relationship type; and a learned embedding corresponding to the particular node, obtained from a final hidden layer of the graph convolutional network model, is provided as input to a prediction layer of the graph convolutional network model to obtain the one or more types of predictions with respect to the particular node; and
utilize a trained version of the graph convolutional network model to obtain a prediction pertaining to one or more instances of one or more entity types, including a prediction of a probability that a particular item will be returned after acquisition by an item consumer.

2. The system as recited in claim 1, wherein the representation of the particular node at the particular hidden layer is based at least in part on the representation of the particular node at a different hidden layer of the graph convolutional network model.

3. The system as recited in claim 1, wherein the one or more computing devices include further instructions that upon execution on or across the one or more processors further cause the one or more computing devices to:
obtain, via the one or more programmatic interfaces, an indication of a workflow to be used to generate at least a portion of the respective initial feature sets; and
execute the workflow to generate at least the portion of the respective initial feature sets.

4. The system as recited in claim 1, wherein the one or more computing devices include further instructions that upon execution on or across the one or more processors further cause the one or more computing devices to:
utilize one or more other machine learning models to generate at least a portion of the respective initial feature sets.

5. The system as recited in claim 1, wherein the one or more computing devices include further instructions that upon execution on or across the one or more processors further cause the one or more computing devices to:
obtain, via the one or more programmatic interfaces, respective values of one or more hyper-parameters of the graph convolutional network model.

6. A method, comprising:
performing, at one or more computing devices:
obtaining a respective initial feature set for individual ones of a plurality of nodes of a graph representation of a training data set, wherein the graph representation comprises a plurality of nodes and a plurality of edges, wherein a node of the plurality of nodes represents an instance of an entity type, wherein an edge between a pair of nodes indicates a relationship of a particular relationship type between the respective instances represented by the pair of nodes;
training, using the graph representation and the respective initial feature sets, a graph convolutional network model to generate one or more types of predictions, wherein:
a representation of a particular node at a particular hidden layer of the graph convolutional network model is based at least in part on aggregated representations of neighbor nodes of the particular node, wherein the representations of the neighbor nodes are aggregated with respect to one or more relationship types; and
a learned embedding corresponding to the particular node, obtained from a final hidden layer of the graph convolutional network model, is used to generate the one or more types of predictions with respect to the particular node; and storing a trained version of the graph convolutional model.

7. The method as recited in claim 6, wherein the representation of the particular node at the particular hidden layer of the graph convolutional network model is based at least in part on the representation of the particular node at a different hidden layer of the graph convolutional network model.

8. The method as recited in claim 6, further comprising performing, at the one or more computing devices:

obtaining, via one or more programmatic interfaces, an indication of a workflow to be used to generate at least a portion of the respective initial feature sets; and executing the workflow to generate at least the portion of the respective initial feature sets.

9. The method as recited in claim 6, further comprising performing, at the one or more computing devices:

executing one or more other machine learning models to generate at least a portion of the respective initial feature sets.

10. The method as recited in claim 6, further comprising performing, at the one or more computing devices:

obtaining a plurality of event records pertaining to instances of one or more entity types of a plurality of entity types; and generating at least a portion of the graph representation from the plurality of event records.

11. The method as recited in claim 6, further comprising performing, at the one or more computing devices:

obtaining, via one or more programmatic interfaces, respective values of one or more hyper-parameters of the graph convolutional network model.

12. The method as recited in claim 6, wherein the one or more types of predictions comprise one or more of: (a) a predicted probability of an occurrence of an item acquisition transaction of a particular type, (b) a predicted probability that a review of an item does not satisfy an acceptability standard, (c) a predicted probability that an item of an inventory will be returned after the item has been purchased, (d) a predicted probability that a content item will reach a popularity threshold, or (e) a predicted demand for an item.

13. The method as recited in claim 6, wherein the plurality of relationship types include one or more of: (a) a has-purchased-from relationship between an item consumer and an item source, (b) a has-in-stock relationship between an item and an item source, (c) a has-rated-source relationship between an item consumer and an item source, (d) a has-reviewed-item relationship between an item consumer and an item, (d) a sells relationship between an item source and an item, (e) a has-purchased relationship between an item consumer and an item, (f) a has-clicked-on-link relationship between an item consumer and an item, (g) a same-item-category relationship between one item and another item, or (h) a similarity-score relationship between one item and another item.

14. The method as recited in claim 6, further comprising performing, at the one or more computing devices:

obtaining a programmatic request to train the graph convolution model, wherein said training is initiated in response to the programmatic request.

15. The method as recited in claim 6, further comprising performing, at the one or more computing devices:

causing, based at least in part on results obtained using the trained version of the graph convolutional network model, one or more of: (a) displayed content of a web site to be modified, (b) one or more promotional offers pertaining to an e-retail web site to be presented, (c) a change to a fulfillment plan for one or more items or (d) a transfer of one or more items to meet an anticipated demand.

16. One or more non-transitory computer-accessible storage media storing program instructions that when executed on or across one or more processors cause one or more computer systems to:

obtain a respective initial feature set for individual ones of a plurality of nodes of a graph representation of a training data set, wherein the graph representation comprises a plurality of nodes and a plurality of edges, wherein a node of the plurality of nodes represents an instance of an entity type, wherein an edge between a pair of nodes indicates a relationship of a particular relationship type between the respective instances represented by the pair of nodes;

train, using the graph representation and the respective initial feature sets, a graph convolutional network model to generate one or more types of predictions, wherein:

a representation of a particular node at a particular hidden layer of the graph convolutional network model is based at least in part on aggregated representations of neighbor nodes of the particular node, wherein the representations of the neighbor nodes are aggregated with respect to one or more relationship types; and a learned embedding corresponding to the particular node, obtained from a final hidden layer of the graph convolutional network model, is used to generate the one or more types of predictions with respect to the particular node; and store a trained version of the graph convolutional model.

17. The one or more non-transitory computer-accessible storage media as recited in claim 16, wherein the representation of the particular node at the particular hidden layer of the graph convolutional network model is based at least in part on the representation of the particular node at a different hidden layer of the graph convolutional network model.

18. The one or more non-transitory computer-accessible storage media as recited in claim 16, storing further program instructions that when executed on or across one or more processors further cause the one or more computer systems to:

obtain, via one or more programmatic interfaces, an indication of a workflow to be used to generate at least a portion of the respective initial feature sets; and executing the workflow to generate at least the portion of the respective initial feature sets.

19. The one or more non-transitory computer-accessible storage media as recited in claim 16, storing further program instructions that when executed on or across one or more processors further cause the one or more computer systems to:

execute one or more other machine learning models to generate at least a portion of the respective initial feature sets.

20. The one or more non-transitory computer-accessible storage media as recited in claim 16, storing further program instructions that when executed on or across one or more processors further cause the one or more computer systems to:

obtain a plurality of event records pertaining to instances of one or more entity types of a plurality of entity types; and generate at least a portion of the graph representation from the plurality of event records.

\* \* \* \* \*